United States Patent
Zhang et al.

(10) Patent No.: US 11,928,030 B2
(45) Date of Patent: Mar. 12, 2024

(54) OPTIMIZE BACKUP FROM UNIVERSAL SHARE

(71) Applicant: Veritas Technologies LLC, Santa Clara, CA (US)

(72) Inventors: Shuangmin Zhang, Beijing (CN); Xianbo Zhang, Plymouth, MN (US); Shengzhao Li, Beijing (CN); Xu Jiang, Beijing (CN); Weibao Wu, Vadnais Heights, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 112 days.

(21) Appl. No.: 16/835,657

(22) Filed: Mar. 31, 2020

(65) Prior Publication Data
US 2021/0303408 A1    Sep. 30, 2021

(51) Int. Cl.
*G06F 11/14* (2006.01)

(52) U.S. Cl.
CPC ...... *G06F 11/1453* (2013.01); *G06F 11/1451* (2013.01); *G06F 11/1461* (2013.01); *G06F 11/1464* (2013.01); *G06F 11/1469* (2013.01)

(58) Field of Classification Search
CPC ............ G06F 11/1453; G06F 11/1451; G06F 11/1461; G06F 11/1464; G06F 11/1469
See application file for complete search history.

(56) References Cited

U.S. PATENT DOCUMENTS 5,649,152 A      7/1997   Ohran et al. ............. G06F 12/00
5,835,953 A * 11/1998   Ohran ................. G06F 11/1466
                                                                    711/162

(Continued)

FOREIGN PATENT DOCUMENTS

CN        109154905 A   *   1/2019  ............. G06F 3/067
JP         2020047107 A   *   3/2020  ........... G06F 3/0641
WO    WO 2017/014814       1/2017

OTHER PUBLICATIONS

PCT International Written Opinion and Search Report of the International Searching Authority for Application No. PCT/US2021/015384 dated Apr. 13, 2021, 12 pages.

(Continued)

*Primary Examiner* — Charles Rones
*Assistant Examiner* — Alexander Vinnitsky
(74) *Attorney, Agent, or Firm* — Campbell Stephenson LLP

(57) ABSTRACT

A method includes creating a deduplicated universal share (US) of data objects, which in turn includes receiving a US of the data objects, deduplicating the US, wherein deduplicating the US includes: hashing segments of the US to generate respective US segment fingerprints; comparing US segment fingerprints to fingerprints for respective segments held in deduplication storage in order to identify segments in the deduplication storage that equate to the US segments, respectively, of the US; storing identifiers that directly or indirectly identify locations, respectively, of the segments, respectively, in the deduplication storage that equate to the US segments, respectively, of the US. After creating the deduplicated universal share, a deduplicated backup of the US is created without reassembling the US from segments held in the deduplication storage, the creating the deduplicated backup including: creating a list that comprises copies of the stored identifiers, and storing the list.

15 Claims, 8 Drawing Sheets

(56) References Cited

U.S. PATENT DOCUMENTS

| | | | | |
|---|---|---|---|---|
| 5,875,479 | A | 2/1999 | Blount et al. | G06F 12/16 |
| 5,915,098 | A | 6/1999 | Palmer et al. | G06F 13/00 |
| 6,073,222 | A | 6/2000 | Ohran | G06F 12/00 |
| 6,085,298 | A | 7/2000 | Ohran | G06F 12/16 |
| RE37,601 | E | 3/2002 | Eastridge et al. | G06F 11/00 |
| 6,728,898 | B2 | 4/2004 | Tremblay et al. | G06F 11/00 |
| 6,732,245 | B2 | 5/2004 | Kaiya et al. | G06F 12/00 |
| 6,779,093 | B1 | 8/2004 | Gupta | G06F 12/06 |
| 7,103,796 | B1 | 9/2006 | Kekre et al. | G06F 11/00 |
| 7,386,752 | B1 | 6/2008 | Rakic et al. | |
| 7,987,368 | B2 | 7/2011 | Zhu et al. | |
| 8,577,850 | B1 * | 11/2013 | Genda | G06F 11/1453 707/692 |
| 8,874,508 | B1 | 10/2014 | Mittal | G06F 17/00 |
| 9,087,088 | B1 | 7/2015 | Bose et al. | |
| 9,442,806 | B1 * | 9/2016 | Bardale | G06F 3/0608 |
| 9,509,697 | B1 | 11/2016 | Salehpour | |
| 9,575,789 | B1 | 2/2017 | Rangari et al. | |
| 9,740,422 | B1 | 8/2017 | Ozdemir | G06F 3/0641 |
| 9,830,111 | B1 * | 11/2017 | Patiejunas | G06F 3/0625 |
| 10,496,494 | B1 * | 12/2019 | Haloi | G06F 16/148 |
| 10,592,149 | B1 * | 3/2020 | Jenkins | G06F 16/1748 |
| 11,093,453 | B1 * | 8/2021 | Reza | G06F 3/065 |
| 2003/0014433 | A1 | 1/2003 | Teloh et al. | G06F 12/00 |
| 2003/0061366 | A1 | 3/2003 | Musante | G06F 15/16 |
| 2003/0126388 | A1 | 7/2003 | Yamagami | G06F 13/00 |
| 2003/0158869 | A1 | 8/2003 | Micka | G06F 12/00 |
| 2004/0049365 | A1 | 3/2004 | Keller et al. | |
| 2007/0185937 | A1 | 8/2007 | Prahlad et al. | G06F 17/30 |
| 2008/0279204 | A1 | 11/2008 | Pratt, Jr. | |
| 2009/0187923 | A1 | 7/2009 | Mckinney | |
| 2010/0070447 | A1 | 3/2010 | Pfuntner et al. | |
| 2010/0169720 | A1 | 7/2010 | Lumpp et al. | |
| 2011/0126099 | A1 | 5/2011 | Anderson et al. | |
| 2013/0054523 | A1 | 2/2013 | Anglin et al. | G06F 17/30 |
| 2014/0046909 | A1 * | 2/2014 | Patiejunas | G06F 16/24554 707/687 |
| 2014/0047040 | A1 * | 2/2014 | Patiejunas | G06F 16/219 709/219 |
| 2015/0278395 | A1 | 10/2015 | Ben Jemaa | G06F 16/9024 |
| 2015/0280999 | A1 | 10/2015 | Chart et al. | |
| 2016/0306560 | A1 * | 10/2016 | Maranna | G06F 3/067 |
| 2016/0371007 | A1 | 12/2016 | Shani | G06F 3/065 |
| 2017/0286690 | A1 | 10/2017 | Chari et al. | |
| 2017/0289187 | A1 | 10/2017 | Noel et al. | |
| 2017/0300244 | A1 | 10/2017 | Crawford et al. | G06F 3/0619 |
| 2018/0109425 | A1 | 4/2018 | Chart et al. | |
| 2018/0285201 | A1 | 10/2018 | Bangalore | G06F 11/14 |
| 2018/0295029 | A1 | 10/2018 | Shivaana | |
| 2019/0138995 | A1 | 5/2019 | Currin | |
| 2020/0097198 | A1 * | 3/2020 | Bansal | G06F 11/1448 |

OTHER PUBLICATIONS

Bandopadhyay, Tushar et al.; "System and Method to Propagate Information Across a Connected Set of Entities Irrespective of the Specific Entity Type"; U.S. Appl. No. 15/857,577, filed Dec. 28, 2017; consisting of Specification, Claims, Abstract, and Drawings; 46 pages.

Bandopadhyay, Tushar et al.; "Method and System for Dependency Analysis of Workloads for Orchestration"; U.S. Appl. No. 15/844,359, filed Dec. 15, 2017; consisting of Specification, Claims, Abstract, and Drawings; 77 pages.

Patil, Rushikesh et al. "Method and System for Data Consistency Across Failure and Recovery of Infrastructure"; U.S. Appl. No. 16/836,288, filed Mar. 31, 2020; consisting of Specification, Claims, Abstract, and Drawings; 29 pages.

Patil, Rushikesh et al.; "Methods and Systems for Data Resynchronization in a Replication Environment"; U.S. Appl. No. 16/805,294, filed Feb. 28, 2020; consisting of Specification, Claims, Abstract, and Drawings; 67 pages.

Patil, Rushikesh Patil et al.; "Methods and Systems for Data Resynchronization in a Replication Environment"; U.S. Appl. No. 16/805,292, filed Feb. 28, 2020; consisting of Specification, Claims, Abstract, and Drawings; 49 pages.

Alferes, Jose Julio et al.; "Chapter 3—Evolution and Reactivity in the Semantic Web"; F. Bry and J. Maluszynski (Eds.): Semantic Techniques for the Web; Lecture Notes in Computer Science—5500; Sep. 29, 2009; pp. 161-200.

Deng, Li et al., "vMerger: Server Consolidation in Virtualized Environment," 2013 IEEE 11th Int'l Conference on Dependable. Autonomic and Secure Computing, pp. 606-612.

PCT International Written Opinion and Search Report of the International Searching Authority for Application No. PCT/US2021/015379 dated May 12, 2021, 12 pages.

PCT International Written Opinion and Search Report of the International Searching Authority for Application No. PCT/US2021/024850 dated Aug. 2, 2021, 14 pages.

* cited by examiner

OPTIMIZE BACKUP FROM UNIVERSAL SHARE

BACKGROUND

A data backup, or backup, is a copy of computer data taken during a backup operation and stored elsewhere so that it may be later used, for example, to recover data after the data is lost due to corruption or inadvertent deletion. Performing regular backup operations on data used by production machines (e.g., servers) is one of the main components of a business's disaster recovery plan.

Some businesses use backup systems that employ a backup agent running on a server alongside a production application. At the start of a backup operation, the backup agent selects objects of production data (e.g., files organized into a filesystem), and corresponding metadata (e.g., file name, file size, etc.). The backup agent sends the extracted data objects and metadata over a data link (e.g., the Internet) to a backup storage system (typically proprietary) that includes a backup media server.

Raw backups received by backup media servers can be large. Backup media servers may host a data deduplication engine to reduce the size of backups and thus the cost of storage thereof. During deduplication, backup data is logically separated into fixed or variable sized segments. Hash fingerprints (e.g., 128 bit MD5 values) are calculated for each of the backup segments. These fingerprints are compared to fingerprints of segments in deduplication storage in order to identify segments in the deduplication storage that equate to the backup segments. A list of identifiers that directly or indirectly identify locations of the segments in the deduplication storage that equate to the backup segments, respectively, is stored as metadata for the deduplicated backup. Given that the same backup segment may occur dozens, hundreds, or even thousands of times, large backups can be greatly reduced in size prior to storage as a deduplicated backup. The identifier list can be used to "rehydrate" (i.e., reassemble using segments read out from the deduplication storage) the backup or individual files thereof so that they can be read for any one of many different reasons. The purpose of reading the data can be to restore data at the production server, replicate the backup to less expensive storage location, etc.

Backup agents can burden production servers and administrators with immense overhead. For example, agents can put a heavy load on the CPU of the production server with read, process, and write operations. Agents may occupy substantial amounts of memory on the production server. Administrators are required to install and maintain agents, etc. Agentless backup systems, by contrast, do not rely on backup agents inside production servers.

SUMMARY

A method and apparatus is disclosed for optimizing backups. In one embodiment, the method includes creating a deduplicated copy of data objects, which in turn includes receiving a copy of the data objects, deduplicating the copy, wherein deduplicating the copy includes: hashing segments of the copy to generate respective copy segment fingerprints; comparing the copy segment fingerprints to fingerprints for respective segments held in deduplication storage in order to identify segments in the deduplication storage that equate to the segments, respectively, of the copy; storing identifiers that directly or indirectly identify locations, respectively, of the segments, respectively, in the deduplication storage that equate to the segments, respectively, of the copy. After creating the deduplicated copy, a deduplicated backup of the data objects is created without reassembling the copy from segments held in the deduplication storage, the creating the deduplicated backup including: creating a list that comprises copies of the stored identifiers, and storing the list.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

Figure 1:
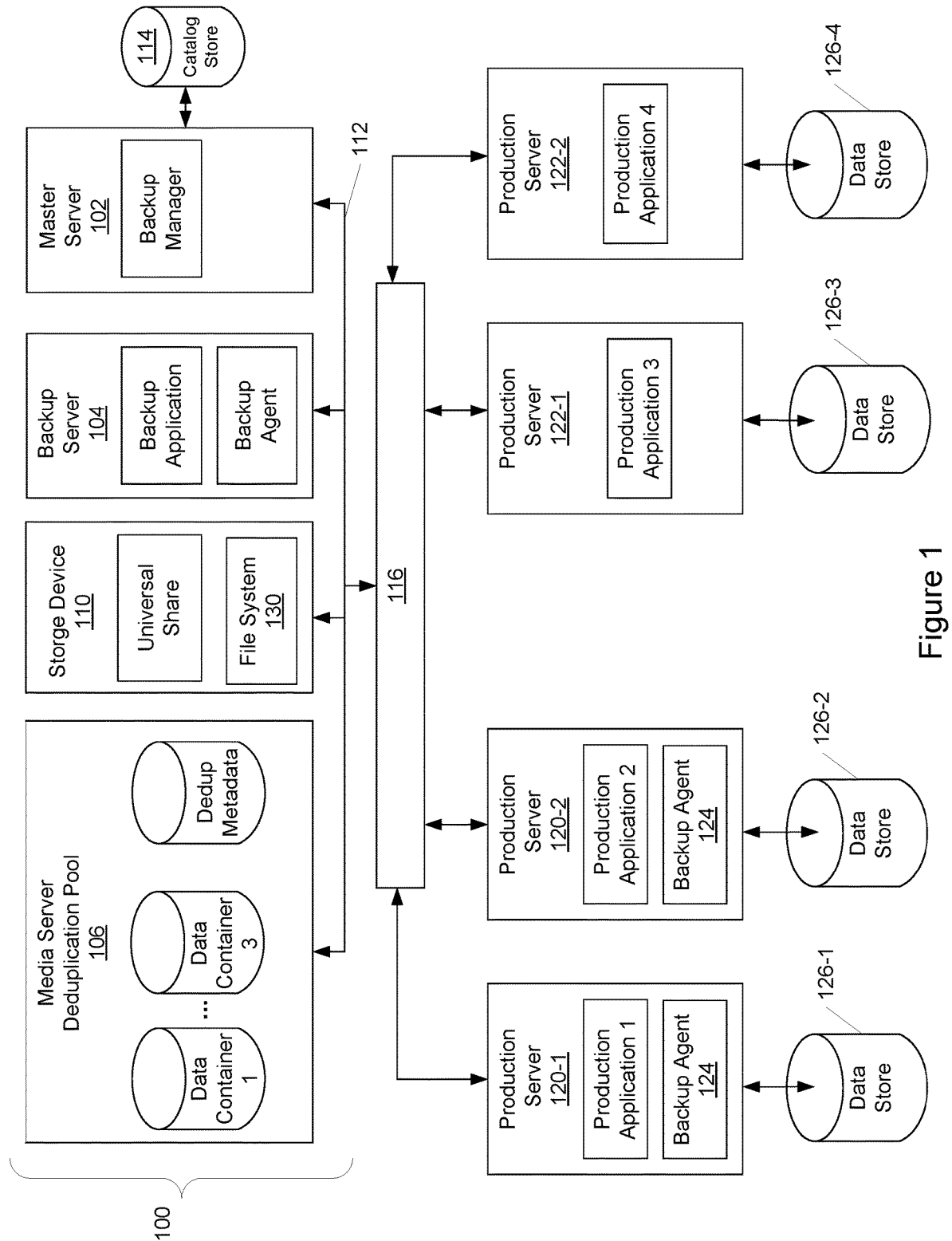
FIG. 1 is a simplified block diagram illustrating an example of a system employing one embodiment of the present disclosure.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover all modifications, equivalents and alternatives falling within the spirit and scope of methods and systems such as those described herein, as defined by the appended claims.

DETAILED DESCRIPTION

FIG. 1 is a block diagram illustrating relevant components of an enterprise-level, heterogeneous backup storage system 100 that can store deduplicated backup copies of production data. This system provides cross-platform backup functionality to a large variety of operating systems executing on production servers. Backup storage system 100 includes a central master server 102 and one or more backup media servers 104. For ease of explanation, only one backup media server 104 is shown. Backup storage system 100 also includes deduplication storage 106 and a storage device 110 (e.g., server or appliance), which acts as a generic disc target for storing copies of data from production servers that lack a backup agent. Deduplication storage 106 takes form in a Media Server Deduplication Pool (MSDP), which uses logical data containers to store unique data segments, it being understood that the term duplication storage should not be limited thereto. Data segments are stored in MSDP 106 at locations that are mapped to data-container number (DC #), fingerprint pairs as will be more fully described below.

The master server 102, backup server 104, MSDP 106, and storage device 110 are in data communication with each other via local network 112. Additionally, master server 102 is in data communication with catalog store 114, which contains catalogs for respective extents lists, which in turn correspond to respective deduplicated backups as will be more fully described below. Without catalogs, master server 102 cannot manage the lifecycles of backups as will be more fully described below.

Production servers 120 and 122 are in data communication with backup storage system 100 via a data link (e.g., the Internet) 116. Each of these production servers implements a production application executing on one or more processors. The production applications in FIG. 1 may be distinct from each other in size, purpose, function, etc. Storage devices 126 are in data communication with respective servers. Storage devices 126 store production data that is accessible by respective production applications.

Production servers 120 include identical backup agents 124 executing on one or more processors thereof. Backup agents communicate with the backup application executing on media backup server 104. In a sense, backup server 104 acts as an interface for backup system 100. During a backup operation each backup agent 124 can access, select and extract data objects (e.g., files), and data object metadata (e.g., file name, file size, file attributes, etc.). For ease of explanation only, the present disclosure will be described with reference to "files," it being understood the term data object should not be limited thereto. The backup agent can send the extracted data and metadata over data link 116 to backup server 104 for storage in MSDP 106 as a deduplicated backup. Production servers 122 do not implement backup agents 124. Rather, custom scripts are created for respective production servers 122 to dump a copy of production data to "universal shares" or generic target disks of storage device 110 via standard interfaces (e.g., CIFS, NFS, iSCSI, etc.). A universal share accommodates nearly all operating systems (e.g., Linux, Unix, and Windows), and provides access to production data in its native format.

Figure 2:
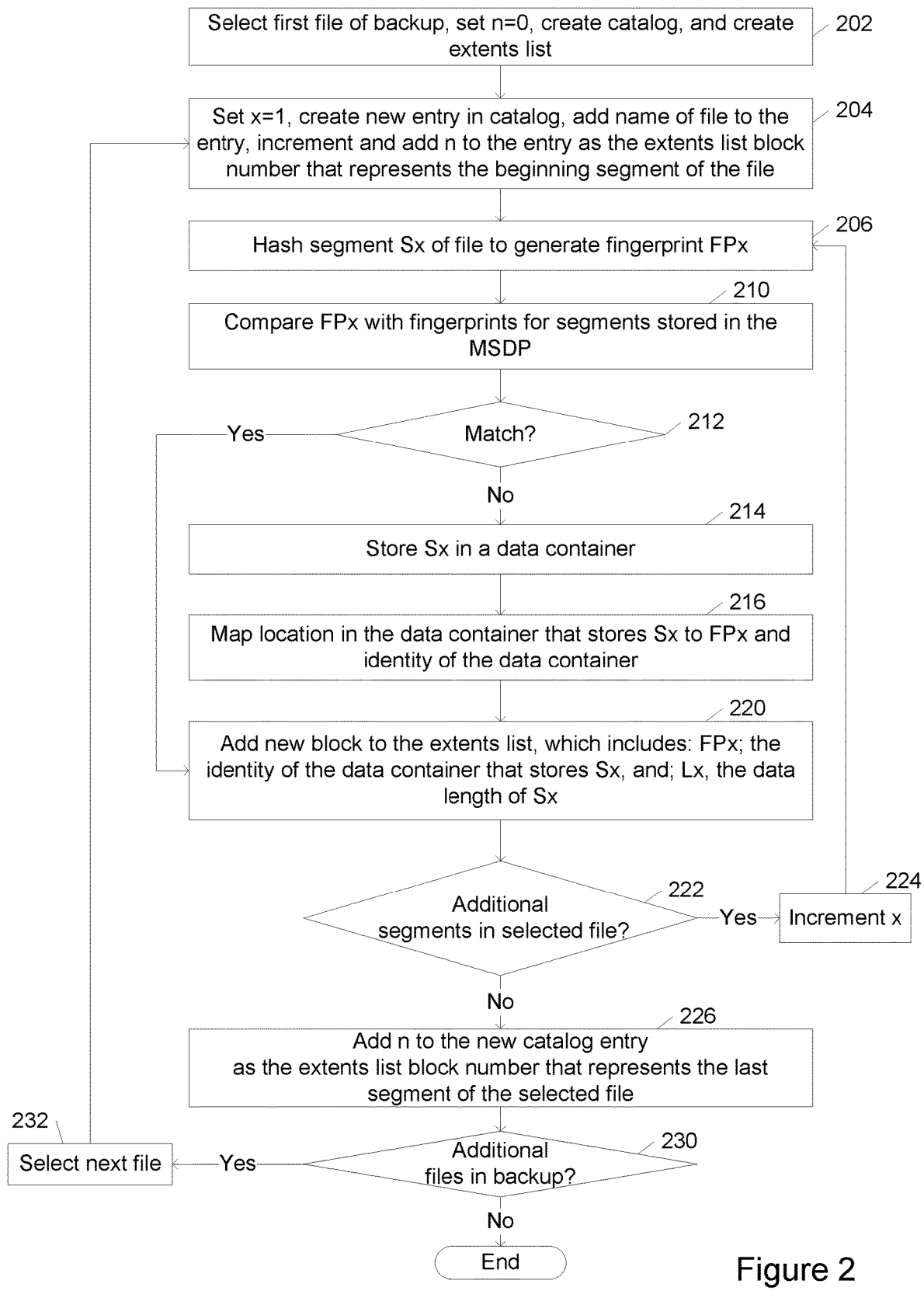
FIG. 2 is a flow diagram illustrating relevant aspects of a process for deduplicating data.

Production data can be backed up to backup server 104 via backup agent 124, or copied to storage device 110 via custom scripts. During a backup operation involving a backup agent 124, backup server 104 receives backup data and metadata from the agent via data link 116 in a recognizable flow. Backup server 104 includes a deduplication engine (not shown), which deduplicates the backup data it receives. FIG. 2 illustrates relevant steps of an example process for deduplicating a backup received from an agent 124. The process of FIG. 2 starts when backup server 104 begins receiving file data and metadata of the backup. At step 202 the backup application selects the first file of the backup. In step 202 the backup application also sets a variable n=0, creates an empty catalog and an empty extents list. The catalog can be considered as an index into the extents list and is needed for lifecycle management. The catalog may include entries each corresponding to a file of the backup.

Figure 3:
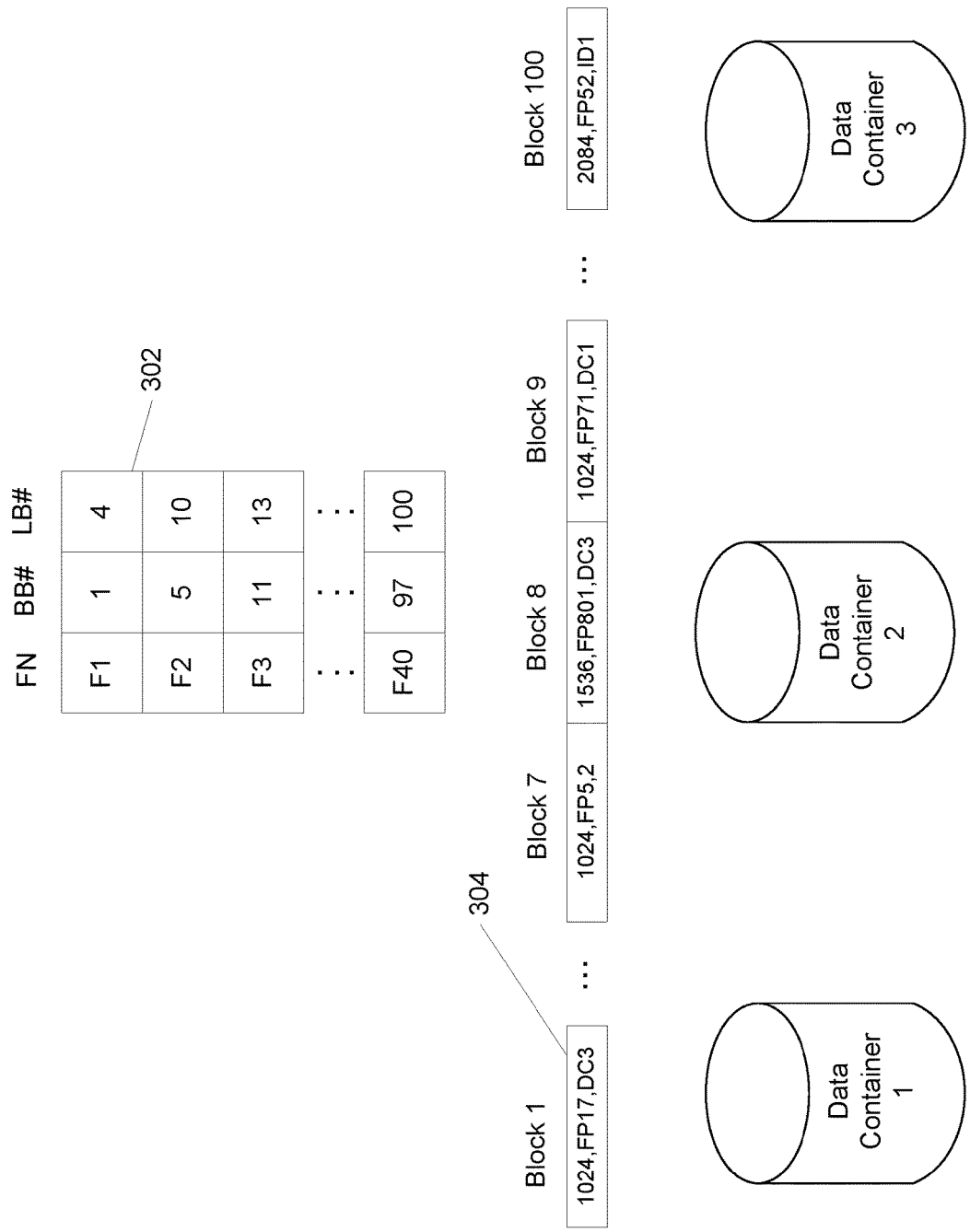
FIG. 3 illustrates example extents list and catalogs created by the process of FIG. 2.

FIG. 3 illustrates an example catalog 302, and an example extents list 304 for a backup that has 40 separate files F1-F40. The extents list 304 includes a sequence of 100 blocks, one for each segment of the backup. Each block contains a segment size and an identifier in MSDP 106 where a segment can be found. MSDP 106 includes a plurality of data containers. For the purposes of explanation only the example MSDP 106 of FIGS. 1 and 3 includes 3 data containers, it being understood that MSDP 106 may include more than 3 data containers or fewer than 3 data containers. Each identifier of an extents list block consists of a fingerprint and container ID pair. Each fingerprint/container ID can be translated into a location within one of the data containers 1-3 where a corresponding segment can be accessed. The catalog includes entries, each corresponding to a file of the backup. Each entry includes a filename FN (e.g., FN=F1 in FIG. 3), the block number (BB #) in the extents list that represents the first or beginning segment of the file, and the block number (LB #) in the extents list that represents the last segment of the file.

In step 204, backup application sets variable x=1, and creates a new entry in the catalog. The backup application also adds the name or identity of the selected file to the catalog entry. The backup application increments variable n. Additionally, in step 204, the backup application adds incremented n to the catalog entry as the block number in the extents list for the block that represents the first or beginning segment of the selected file.

During deduplication, file data is logically separated into fixed or variable sized segments (e.g., BB #=1 in FIG. 3). Backup server 104 includes a hashing algorithm to calculate a hash value for the file segments. The first segment (i.e., Sx where x=1) of the selected file is hashed to generate a fingerprint FPx in step 206. This fingerprint is compared with the fingerprints of segments stored within MSDP in order to identify a segment in MSDP 106 that equates to Sx. If there is no match between FPx and fingerprints within MSDP in step 212, the process proceeds to step 214 where segment Sx is stored in a data container (e.g., data container 1) of MSDP 106. Thereafter the location in the data container that stores the segment Sx is mapped to both FPx and the identity of the container that now stores Sx. If there was a match in step 212 or in response to implementing step 216, the process proceeds to step 220 where a new block is added to the extents list that was created in step 202. The new block (e.g., Block 1 in FIG. 3) includes FPx calculated in step 206 (e.g., FP17 in Block 1 of FIG. 3), the identity of the data container in MSDP that stores Sx (e.g., data container 3 or DC3 in Block 1 in FIG. 3), and the length Lx in bytes of Sx (e.g., Lx=1024 of Block 1 in FIG. 3). In step 222 the backup application checks to see if there are additional segments in the selected file. If there are, variable x is incremented in step 224, the next segment Sx of the file is selected, and steps 206-222 are repeated. If, however, the backup application determines that no more segments remain in the selected file, the process proceeds to step 226 where n is added to the catalog entry as the extents list block number of the block that represents the last segment of the selected file. In step 230, the backup application checks for additional files in the backup. If no more files exist, the process ends, the extents list and catalog are stored as metadata for the deduplicated backup, and can later be used to reassemble the backup from segments in MSDP 106. The catalog is stored in catalog store 114 and can be used later for lifecycle management. Otherwise the next file is selected in step 232 and process steps 204-230 are repeated.

As noted, production servers 122 do not implement backup agents 124. Rather, custom scripts are created for respective production servers 122 to dump their production data to universal shares of storage device 110. Data can be placed in a removed from a universal share by a production server 122 that mounts the share as a client. However, neither the backup application executing on server 104 nor the backup manager executing on master server 102 can access data from a universal share. As a result, any lifecycle management of a production data dump to a universal share should be done in a manual manner.

Storage device 110 includes a deduplication engine (not shown), which can deduplicate the data dumped to a universal share. Importantly, the data dump to a universal share can be deduplicated using the same deduplication storage (i.e., MSDP 106) that is used by the deduplication process described with reference to FIG. 2. However, the deduplication process implemented in storage device 110 is substantially different than that shown within FIG. 2, and produces deduplicated data dumps with substantially different formats. Catalogs, like catalog 302 shown in FIG. 3, are not created by the deduplication process.

Figure 4:
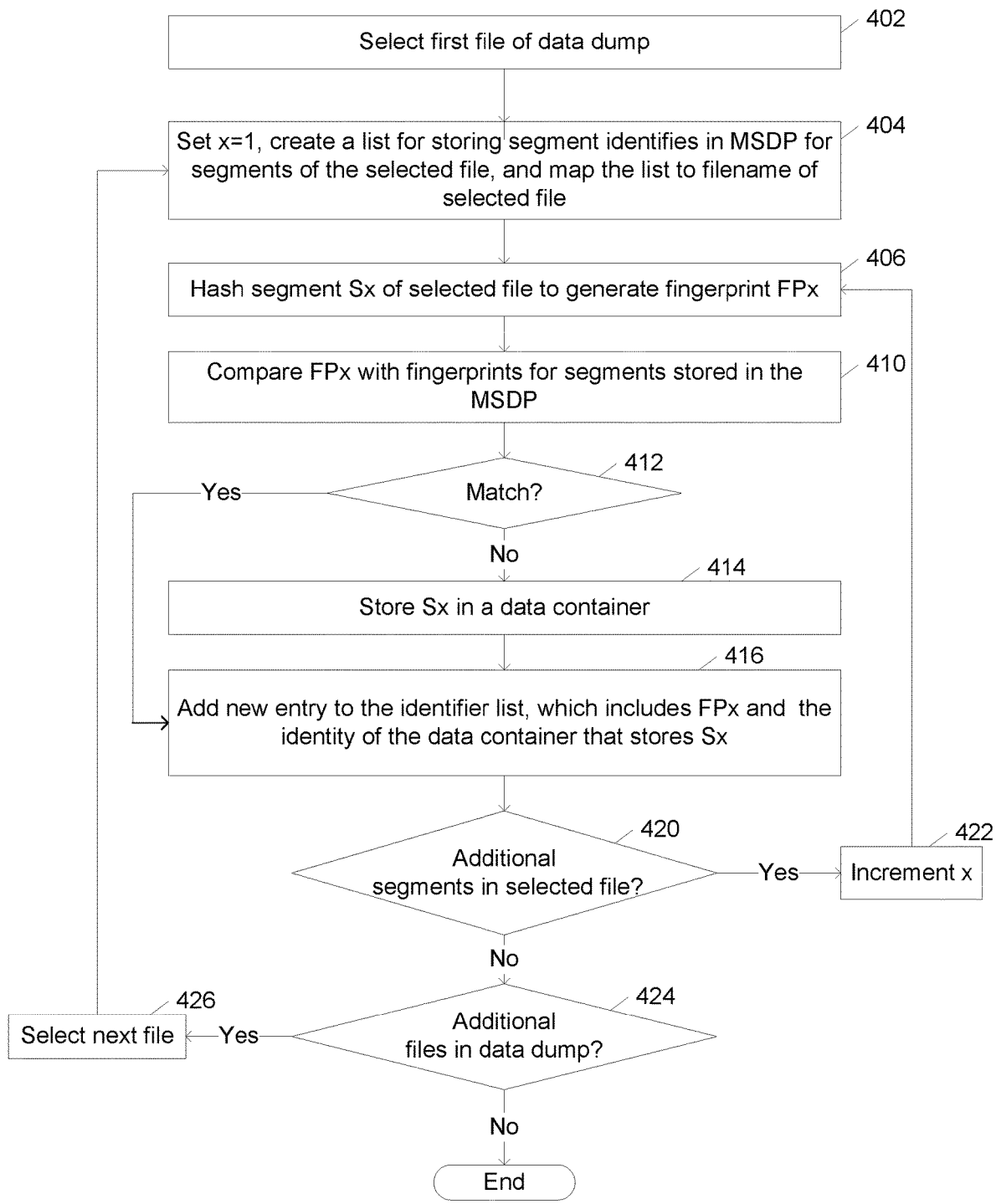
FIG. 4 is a flow diagram illustrating relevant aspects of a process for deduplicating data.

FIG. 4 illustrates an example of the process that could be used by storage device 110 to deduplicate data dumped to a universal share, it being understood that a substantially different process can be used in alternative embodiments. The process of FIG. 4 begins after storage device 110 begins to receive a data and metadata of a dump to a universal share. At step 402, storage device 110 selects the first file of the dump to a universal share. At step 404, storage device 110 sets of variable x=1. Additionally, storage device 110 creates and stores deduplication metadata for the selected file via file system 130. More particularly, in step 404 storage device 110 creates an empty list structure into which segment identifiers in MSDP 106 for segments of the selected file, will be stored. Each identifier of the list consists of a fingerprint and container ID pair, wherein the container ID identifies one of the data containers of MSDP 106. Each fingerprint/container ID can be translated into a location within one of the data containers 1-3 of FIG. 1 where a corresponding segment can be accessed. The list created in step 404 is mapped to the file name of the selected file. During deduplication, file data is logically separated into fixed or variable sized segments. In step 406, a hashing algorithm hashes segment Sx of the selected file to generate fingerprint FPx. For example, the first segment Si of the selected file is hashed to produce a fingerprint FPB. The fingerprint FPx generated in step 406 is compared with fingerprints for segments stored in MSDP 106. If there is no match between FPx and fingerprints within MSDP in step 412, the process proceeds to step 414 where segment Sx is stored in a data container (e.g., data container 1) of MSDP 106. Thereafter the location in the data container that stores the segment Sx is mapped to both FPx and the identity of the container that now stores Sx. If a match exists in step 412 or in response to implementing step 414, the process proceeds to step 416 where a new identifier is added to the identifier list that was created in step 404. The new identifier includes FPx calculated in step 406, and the identity of the data container in MSDP 106 that stores Sx. In step 420 storage device 110 checks to see if there are additional segments in the selected file. If there are, variable x is incremented in step 422, the next segment Sx of the file is selected, and steps 406-420 are repeated. If, however, storage device 110 determines that no more segments remain in the selected file, the process proceeds to step 424 where storage device 110 checks for additional files in the dump to universal share. If no more files exist, the process ends. Otherwise the next file is selected in step 404 and process steps 406-422 are repeated. The identifier lists can later be used to reassemble the backup data dumped into the universal share using segments in MSDP 106.

Master server 102 can perform backup lifecycle management (BLM) of backups. While it might seem obvious, the production data critical to business operations does not need to be treated the same as that which is not critical. With BLM, backup data can be managed for long-term archiving and automated searching/restoration. BLM may categorize backups into two different types: active and inactive. Active backup data is information that a business needs to stay operational. It is understood as information that is critical to run a business. Inactive backup data is defined as information no longer needed to keep the business up and going. As information moves from being 'active' to 'inactive,' it can be moved through a tiered storage system, where higher priority backup data is stored on higher performance, more expensive devices. Inactive backup data is typically relegated to lower-cost, lower-performance devices for storage. This is an important aspect to how data is efficiently and effectively managed. It is important for businesses to know how long backup data needs to be retained. Using this information, companies can develop strategies to manage backup data (i.e., a plan for how it's to be stored) and minimize the cost of storing it.

Master server 102 can manage the lifecycle of backups received and deduplicated by backup server 104. Importantly, master server 102 can manage the lifecycles of backups so long as master server 102 has access to corresponding catalogs and/or extents list. As a result, master server 102 cannot manage the lifecycles of deduplicated production data dumps to a universal share since extents list/catalog pairs are not available for them. Master server 102 could manage the deduplicated dumps if they rehydrated and subsequently deduplicated by backup server 104 using the process of FIG. 2, which would produce the needed extents list/catalog pairs. An intense use of resources (e.g., memory, CPU, I/O, network bandwidth, etc.) within system 100 is needed to rehydrate the production data dumps, and subsequently deduplicate the rehydrated dumps to create extents lists and corresponding catalogs.

The present disclosure provides a more efficient method for master server 102 to manage the lifecycle of deduplicated data dumps to universal shares. The present disclosure takes advantage of the fact that the process of deduplicating data dumped to universal share in FIG. 4 uses the same duplication storage as the process of deduplicating backup data sent to backup server 104 via a backup agent that is shown in FIG. 2. In one embodiment, the present disclosure provides a method and apparatus for creating a backup of production data dumped to a universal share that is manageable by master server 104, which does not require intense use of resources. In one embodiment, the present disclosure provides a method and apparatus for creating a master server 104 manageable backup of the production data dump to a universal share, without having to first reassemble or rehydrate the production data dump, and subsequently deduplicating the rehydrated dump using the process of FIG. 2.

Figure 5:
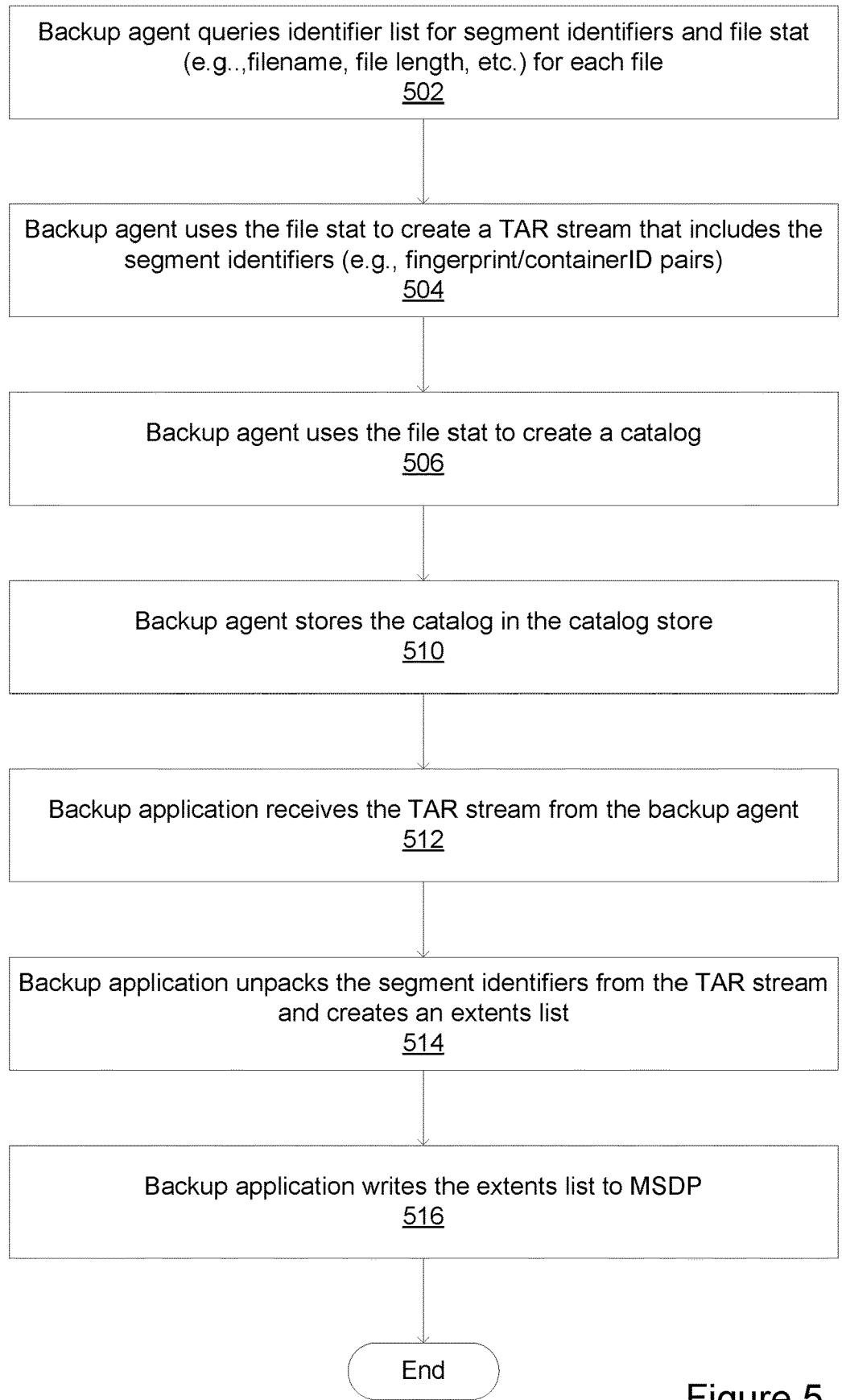
FIG. 5 is a flow diagram illustrating relevant aspects of a process for creating a backup.
Figure 6:
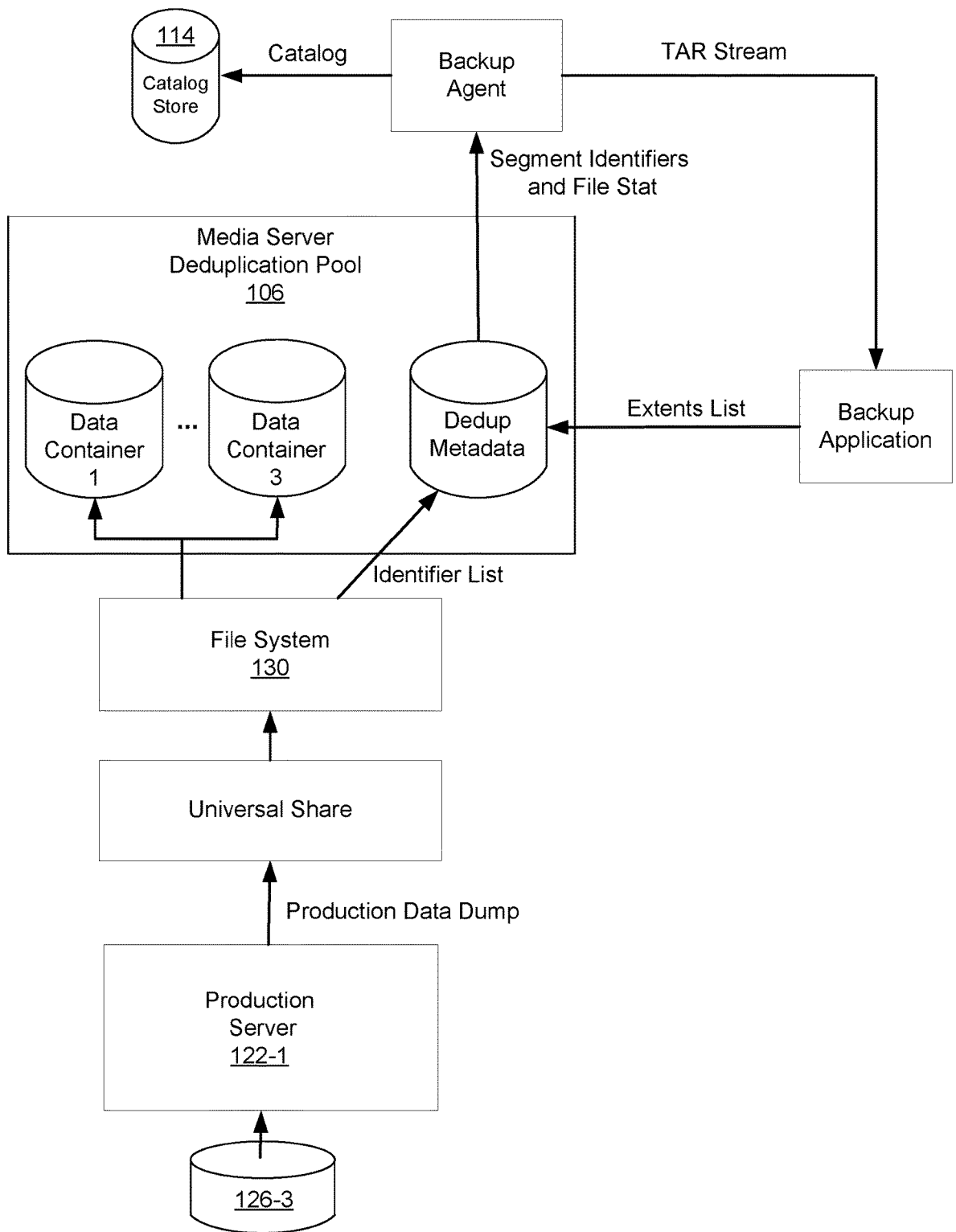
FIG. 6 illustrate relevant aspects of creating a backup.

FIGS. 5 and 6 illustrate relevant aspects of a process for creating a backup of a deduplicated production data dump without having to rehydrate the production data dump according to one embodiment of the present disclosure. FIG. 6 illustrates many of the components shown within FIG. 1, in addition to showing data flows therebetween. FIG. 6 shows production server 122-1 dumping production data to a universal share. This data is subsequently deduplicated in accordance with the process shown in FIG. 4, with an identifier list being stored as metadata in MSDP 106. In step 502 the backup agent shown within FIG. 5 queries the identifier list for the segment identifiers, and file stat (file name, file length, etc.) for each file of the deduplicated data dump. In step 504 the backup agent uses the ioctl to create a TAR (tape archive) stream that includes relevant segment identifiers (e.g., fingerprint/containerID pairs). Although not shown, the TAR stream may include a sequence of components, each of which may include a TAR header followed by a number of relevant segment identifiers. The TAR header can include a filename and other file stat for a file. In step 506 the backup agent also uses the file stat read from MSDP 106 to create a catalog similar to that shown within FIG. 3. This catalog is transmitted in step 510 for storage to catalog store 114 for subsequent use by the master server 102 during backup lifecycle management processes. In step 512 the backup application receives the TAR stream from the backup agent. Backup application unpacks the segment identifiers from the TAR stream, and creates an extent list, which in turn is stored as metadata in MSDP as shown in step 514 and in FIG. 6. Importantly, the extent list and catalog created by the process shown in FIG. 5 and illustrated in FIG. 6, are created without reading segments from MSDP 106. In other words, the process shown in FIG. 5 creates a deduplicated backup of the production data dump without implementing a rehydration of the production data dump. And the lifecycle of the production data dump is manageable by master server 102 since the deduplicated backup has a corresponding catalog in catalog store 114.

An Example Computing and Network Environment

The methods described herein can be implemented using a variety of computing systems (e.g., servers, appliances) and networks. Examples of such computing systems and network environments are described below with reference to FIGS. 7 and 8.

Figure 7:
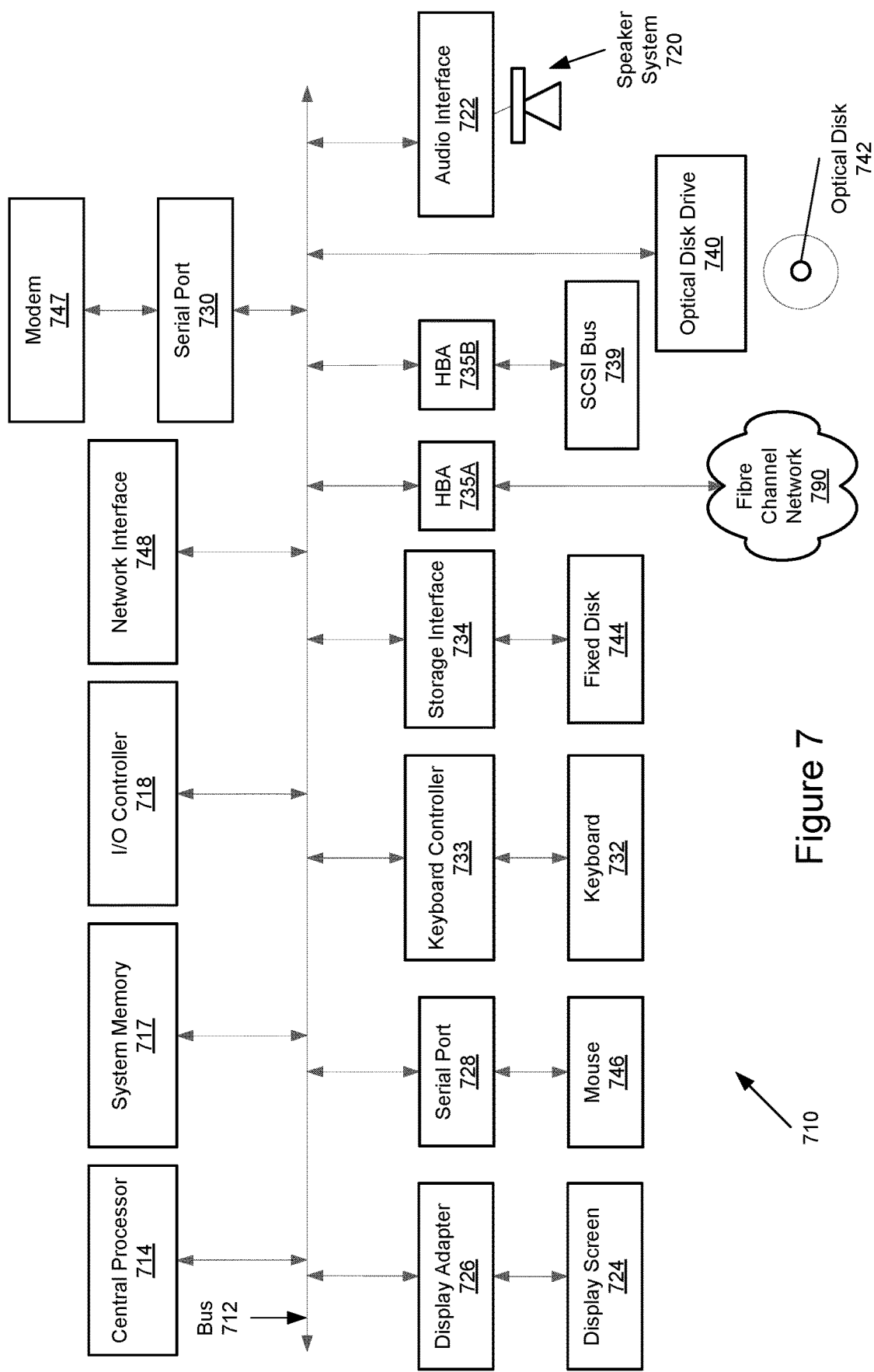
FIG. 7 is a block diagram depicting a computer system suitable for implementing embodiments of methods and systems such as those disclosed herein.

FIG. 7 depicts a block diagram of an example computer system 710 suitable for implementing aspects described herein. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. RAM is generally the main memory into which the operating system and application programs, drivers, and modules like those described above, are loaded. The ROM or flash memory can contain, among other code, the Basic Input-Output System (BIOS) which controls basic hardware operation such as the interaction with peripheral components. Applications, drivers, or modules like those described above, resident with computer system 710 are generally stored on and accessed from a computer-readable storage medium, such as a hard disk drive (e.g., fixed disk 744), an optical drive (e.g., optical drive 740), or other computer-readable storage medium.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via the Internet and an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the systems described herein. The devices and subsystems can be interconnected in different ways from that shown in FIG. 7. The operation of a computer system such as that shown in FIG. 7 is readily known in the art and is not discussed in detail in this application. Code to implement drivers, modules, applications, etc., described herein can be stored in computer-readable storage media such as one or more of system memory 717, fixed disk 744, optical disk 742. The operating system provided on computer system 710 may be MS-DOS®, MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
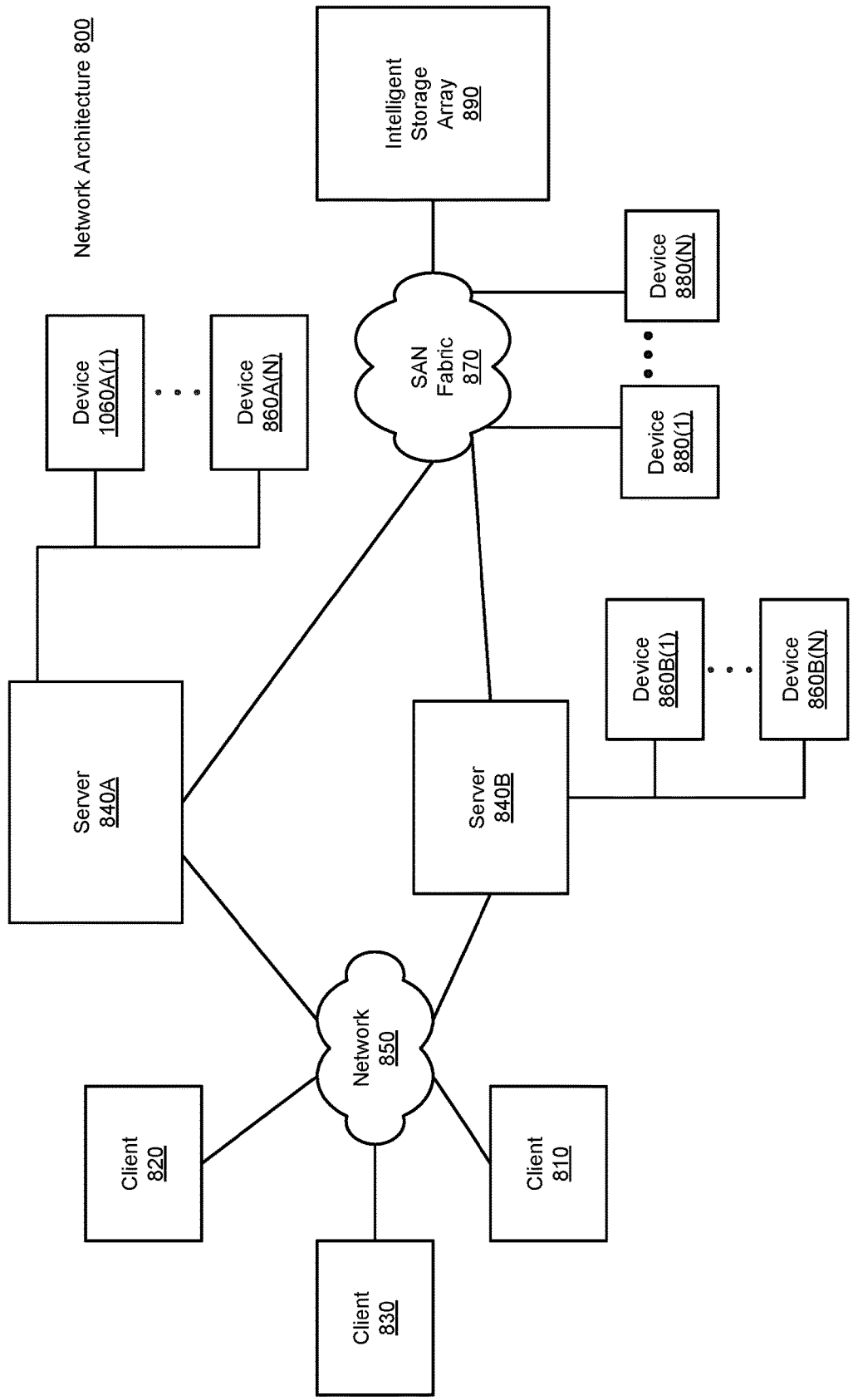
FIG. 8 is a block diagram depicting a network architecture suitable for implementing embodiments of methods and systems such as those disclosed herein.

FIG. 8 is a block diagram depicting a network architecture 800 in which client systems 810, 820 and 830, as well as servers 840A and 840B (any of which can be implemented using computer system 710), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation. SAN fabric 870 supports access to storage devices 880(1)-(N) by servers 840A and 840B, and so by client systems 810, 820 and 830 via network 850. An intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on server 840A or 840B using, for example, a web browser or other client software (not shown). Such a client allows client systems 810, 820 and 830 to access data hosted by server 840A or 840B or one of storage devices 860A(1)-(N), 860B(1)-(N), 880(1)-(N) or intelligent storage array 890. FIG. 8 depicts the use of a network such as the Internet for exchanging data, but the systems described herein are not limited to the Internet or any particular network-based environment.

Other Embodiments

The systems and processes described herein are well adapted to attain the advantages mentioned as well as others inherent therein. While such systems and processes have been depicted, described, and are defined by reference to particular descriptions, such references do not imply a limitation on the claims, and no such limitation is to be inferred. The systems and processes described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components. Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems and methods described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules, or downloaded to one of these devices. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method comprising:
   creating a deduplicated copy of data objects, the creating comprising:
   receiving a copy of the data objects;
   deduplicating the copy, wherein deduplicating the copy comprises:
   hashing segments of the copy to generate respective copy segment fingerprints;
   comparing the copy segment fingerprints to fingerprints for respective segments held in deduplication storage in order to identify segments in the deduplication storage that equate to segments, respectively, of the copy;
   creating and storing a first list of identifiers that directly or indirectly identify locations, respectively, of the segments, respectively, in the deduplication storage that equate to segments, respectively, of the copy;
   after creating the deduplicated copy, creating a deduplicated backup copy of the data objects without reassembling the copy from segments held in the deduplication storage, the creating the deduplicated backup copy comprising:
   creating and storing a second list that comprises a plurality of entries, each entry corresponding to a respective data object of the data objects, wherein each entry comprises a respective plurality of identifiers copied from the first list;
   creating and storing a catalog that maps each entry in the second list to its respective data object of the data objects.

2. The method of claim 1 wherein the data objects comprise files of a filesystem.

3. The method of claim 2 further comprising an act of reassembling the copy using segments held in the deduplication storage, the second list, and the catalog.

4. The method of claim 3 further comprising an act of replicating the reassembled copy to a storage device.

5. The method of claim 1 wherein the copy of the data objects is received at a storage device via standard interfaces thereto via a customized script executing on a production server.

6. The method of claim 1 wherein the identifiers are stored in the first list in a format that is different from a format of the second list of identifiers.

7. A non-transitory computer-readable media comprising executable instructions, wherein a method is implement in response to executing the instructions, the method comprising:
creating a deduplicated copy of data objects, the creating comprising:
receiving a copy of the data objects;
deduplicating the copy, wherein deduplicating the copy comprises:
hashing segments of the copy to generate respective copy segment fingerprints;
comparing the copy segment fingerprints to fingerprints for respective segments held in deduplication storage in order to identify segments in the deduplication storage that equate to segments, respectively, of the copy;
creating and storing a first list of identifiers that directly or indirectly identify locations, respectively, of the segments, respectively, in the deduplication storage that equate to segments, respectively, of the copy;
after creating the deduplicated copy, creating a deduplicated backup copy of the data objects without reassembling the copy from segments held in the deduplication storage, the creating the deduplicated backup copy comprising:
creating and storing a second list that comprises a plurality of entries, each entry corresponding to a respective data object of the data objects, wherein each entry comprises a respective plurality of identifiers copied from the first list;
creating and storing a catalog that maps each entry in the second list to its respective data object of the data objects.

8. The non-transitory computer-readable media of claim 7 wherein the data objects comprise files of a filesystem.

9. The non-transitory computer-readable media of claim 8 wherein the method further comprises an act of reassembling the copy using segments held in the deduplication storage, the second list, and the catalog.

10. The non-transitory computer-readable media of claim 9 wherein the method further comprises an act of replicating the reassembled copy to a storage device.

11. The non-transitory computer-readable media of claim 7 wherein the copy of the data objects is received at a storage device via standard interfaces thereto via a customized script executing on a production server.

12. The non-transitory computer-readable media of claim 7 wherein the identifiers are stored in the first list in a format that is different from a format of the second list of identifiers.

13. A computer system comprising:
one or more processors;
a computer-readable storage medium coupled to the one or more processors; and
a plurality of instructions, encoded in the computer-readable storage medium, wherein a method is implemented in response to executing the instructions, the method comprising:
creating a deduplicated copy of data objects, the creating comprising:
receiving a copy of the data objects;
deduplicating the copy, wherein deduplicating the copy comprises:
hashing segments of the copy to generate respective copy segment fingerprints;
comparing the copy segment fingerprints to fingerprints for respective segments held in deduplication storage in order to identify segments in the deduplication storage that equate to segments, respectively, of the copy;
creating and storing a first list of identifiers that directly or indirectly identify locations, respectively, of the segments, respectively, in the deduplication storage that equate to segments, respectively, of the copy;
after creating the deduplicated copy, creating a deduplicated backup copy of the data objects without reassembling the copy from segments held in the deduplication storage, the creating the deduplicated backup copy comprising:
creating and storing a second list that comprises a plurality of entries, each entry corresponding to a respective data object of the data objects, wherein each entry comprises a respective plurality of identifiers copied from the first list;
creating and storing a catalog that maps each entry in the second list to its respective data object of the data objects.

14. The computer system of claim 13 wherein the method further comprises an act of reassembling the copy using segments held in the deduplication storage, the second list, and the catalog.

15. The computer system of claim 13 wherein the method further comprises an act of replicating the reassembled copy to a storage device.

* * * * *